US011700269B2

(12) United States Patent
Mugambi et al.

(10) Patent No.: US 11,700,269 B2
(45) Date of Patent: Jul. 11, 2023

(54) ANALYZING USER BEHAVIOR PATTERNS TO DETECT COMPROMISED NODES IN AN ENTERPRISE NETWORK

(71) Applicant: Fortinet, Inc., Sunnyvale, CA (US)

(72) Inventors: Ernest Mugambi, Dublin, CA (US); Partha Bhattacharya, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 997 days.

(21) Appl. No.: 16/224,194

(22) Filed: Dec. 18, 2018

(65) Prior Publication Data
US 2020/0195672 A1    Jun. 18, 2020

(51) Int. Cl.
*H04L 9/40* (2022.01)
*H04L 41/142* (2022.01)
*H04L 43/04* (2022.01)
*H04L 43/062* (2022.01)
*G06N 20/00* (2019.01)
*H04L 67/50* (2022.01)

(52) U.S. Cl.
CPC ......... *H04L 63/1425* (2013.01); *G06N 20/00* (2019.01); *H04L 41/142* (2013.01); *H04L 43/04* (2013.01); *H04L 43/062* (2013.01); *H04L 63/308* (2013.01); *H04L 67/535* (2022.05)

(58) Field of Classification Search
CPC ... H04L 63/1425; H04L 41/142; H04L 43/04; H04L 43/062; H04L 67/22; H04L 63/308; H04L 43/16; H04L 43/0811; H04L 69/22; G06N 20/00
See application file for complete search history.

(56) References Cited

U.S. PATENT DOCUMENTS 9,280,747 B1 * 3/2016 Jin .................. H04L 51/063
10,685,293 B1 * 6/2020 Heimann ............ H04L 63/1433
(Continued)

OTHER PUBLICATIONS

Neighborhood graphs for estimation of density functionals—Kallur Palli Kumar, Sricharan. ProQuest Dissertations and Theses ProQuest Dissertations Publishing. (2012) (Year: 2012).*
(Continued)

*Primary Examiner* — Michael Won
(74) *Attorney, Agent, or Firm* — HDC Intellectual Property Law, LLP

(57) ABSTRACT

Systems and methods for analyzing user behavior patterns to detect compromised computing devices in an enterprise network are provided. According to one embodiment, an enforcement engine running on a network security device, identifies top users of a network exhibiting a suspicious behavior relating to login failures by determining a first set of users having a number of login failure events during a given time duration exceeding a threshold. The enforcement engine identifies from the first set of computers associated with the top users, a second set of computers exhibiting a suspicious behavior relating to new connections exceeding a threshold. The enforcement engine classifies a third set of computers, representing a subset of the second set exhibiting a suspicious behavior relating to consecutive new connections, as compromised source computers when their respective new connections are in a sequence that results in a Shannon entropy measure exceeding a threshold.

21 Claims, 10 Drawing Sheets

(56) References Cited

U.S. PATENT DOCUMENTS

| | | | |
|---|---|---|---|
| 2009/0024549 A1* | 1/2009 | Johnson | H04L 41/12 |
| | | | 706/46 |
| 2017/0223032 A1* | 8/2017 | El-Moussa | H04L 63/1425 |
| 2018/0027006 A1* | 1/2018 | Zimmermann | H04L 63/0245 |
| | | | 726/11 |
| 2018/0337935 A1* | 11/2018 | Marwah | H04L 63/1425 |
| 2019/0158524 A1* | 5/2019 | Zadeh | H04L 67/30 |
| 2020/0045064 A1* | 2/2020 | Bindal | G06N 20/00 |
| 2020/0228557 A1* | 7/2020 | Lin | G06N 5/047 |
| 2020/0296124 A1* | 9/2020 | Pratt | G06N 20/00 |
| 2020/0358804 A1* | 11/2020 | Crabtree | H04L 63/102 |

OTHER PUBLICATIONS

Schneider, E. "Insider Attack Detection using NetFlow Records and Scan Statistics." Technische Universiteit Eindhoven. Mar. 25, 2017. 83 pgs.

Amidan, Brett G. et al., "Data Outlier Detection using the Chebyshev Theorem." 2005. 7 pgs.

RSA NetWitness® UEBA. Data Sheet. 2 pgs.

RSA NetWitness® UEBA Use Cases. "Powerful Detection for User-Based Threats." Use Case. 2 pgs.

Neil, J. "Scan statistics for the online detection of locally anomalous subgraphs." University of New Mexico UNM Digital Repository. Sep. 16, 2011. 105 pgs.

* cited by examiner

500 ⟶

| FAILED LOGINS COUNT OUTLIER THRESHOLD | TRUE POSITIVE | FALSE POSITIVE | DETECTION RATE |
|---|---|---|---|
| 1 | 41 | 997 | 4.1% |
| 2 | 29 | 546 | 5.31% |
| 3 | 19 | 292 | 6.51% |
| 4 | 13 | 178 | 7.30% |
| 5 | 12 | 118 | 10.17% |
| 6 | 10 | 88 | 11.36% |
| 6 | 9 | 61 | 14.75% |
| 8 | 9 | 32 | 28.13% |
| 9 | 9 | 26 | 34.62% |
| 10 | 9 | 16 | 56.25% |
| 11 | 8 | 14 | 57.14% |
| 12 | 8 | 13 | 61.54% |
| 13 | 6 | 11 | 54.55% |
| 14 | 4 | 11 | 54.55% |
| 15 | 4 | 11 | 36.36% |
| 16 | 4 | 11 | 27.27% |
| 17 | 3 | 11 | 30% |
| 18 | 3 | 10 | 30% |
| 19 | 3 | 10 | 30% |
| 20 | 3 | 10 | 30% |
| 21 | 3 | 10 | 30% |
| 22 | 3 | 10 | 30% |
| 23 | 3 | 10 | 30% |
| 24 | 3 | 10 | 30% |
| 25 | 3 | 10 | 30% |
| 26 | 3 | 10 | 20% |
| 27 | 2 | 10 | 20% |
| 28 | 2 | 10 | 20% |
| 29 | 2 | 10 | 20% |
| 30 | 2 | 10 | 20% |
| 31 | 2 | 10 | 20% |
| 32 | 2 | 4 | 50% |
| 33 | 2 | 4 | 50% |
| 34 | 2 | 4 | 50% |
| 35 | 2 | 4 | 50% |
| 36 | 2 | 4 | 50% |
| 37 | 2 | 4 | 50% |
| 38 | 2 | 4 | 50% |
| 39 | 2 | 4 | 50% |
| 40 | 2 | 4 | 50% |
| 41 | 2 | 4 | 50% |
| 42 | 1 | 3 | 33.33% |
| 795 | 0 | 0 | NaN |

FIG. 5

ANALYZING USER BEHAVIOR PATTERNS TO DETECT COMPROMISED NODES IN AN ENTERPRISE NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network security. In particular, embodiments of the present invention relate to an improved user entity behavior analytics (UEBA) anomaly detection approach that detects compromised nodes as a result of an advanced persistent threat (APT) while also minimizing false positives by identifying and combining various user behavior elements (e.g., failed logins, new computer connections and sequence of connections opened).

Description of the Related Art

Cybersecurity attacks such as advanced persistent threats (APTs) generally follow various stages of an attack chain. At an initial stage of the attack chain, an attacker breaks into a network (e.g., an enterprise network), for example, using phishing scams or social engineering, to gain access to a computing device or node that is a part of the network. Once the node is compromised, the attacker uses the credentials from the compromised node and traverses the network randomly in an attempt to gain access to other nodes from which they might be able to extract sensitive information, such as database resources, high value business information, confidential information, etc. Since the attacker does not know where the desired information might reside, the attacker typically indiscriminately initiates connections to several machines in the network.

User Entity Behavior Analytics (UEBA) analyzes data of an enterprise network or other sources, correlates the data with user information and builds a serialized timeline to identify anomalies from different stages of attack chain. Generally, normal user behavior in the enterprise network is modeled to identify instances when patterns dissimilar from the normal pattern occur such that these instances are detected as anomalies. Thus, anomaly detection in UEBA involves tracking traits such as times at which the nodes communicate, nodes which are in communication, frequency of communication among the nodes, failed logins, sequences of communication, key players and the like.

Currently, anomaly detection techniques based on UEBA utilize statistical methods to track behavioral changes against the backdrop of normal behavior by determining probabilities to reflect deviation from the normal behavior to flag the anomalies. In a known technique, a network is modeled as a directed graph, where each device is considered as a node and a directional connection between two devices is considered as an edge. Since each device may communicate with multiple other devices, the network model can have a large number of edges. During a training period, historical rates of activity for each edge is profiled and stored as parameters indicating normal behavior. Activity rates of each edge are observed within a time span and the probability of observing flow counts greater than the profiled parameters is computed. Further, by determining and combining probabilities from new connections and comparing with respective normal expected levels, anomalous nodes are identified.

Current UEBA techniques have a number of limitations. For instance, the network administrator is tasked with selecting the right statistical distribution reflecting behavior of communication edges and the right training time span with substantial data to learn parameters, which in itself is a difficult task. Additionally, the profiling performed by existing UEBA approaches involves keeping track of activities for a very large number of communication edges, which can run into thousands or millions of parameters, thereby requiring analysis of a large amount of data and increased complexity. Furthermore, identifying anomalies by solely relying on disparate parameters usually leads to a large number of false alarms. Trying to ascertain the veracity of false alarms is a tedious, time-consuming and costly process, thereby, making false alarms one of the prime concerns that discourage adoption of machine learning in the anomaly detection space.

Therefore, there is a need in the art for a technique that provides simplified detection of compromised nodes with minimal false positives in order to enhance reliability. Further, there is a need in the art to develop the technique, which requires minimal training data and relies on minimal parameters to increase computational speed.

SUMMARY

Systems and methods are described for analyzing user behavior patterns to detect compromised computing devices in an enterprise network. According to one embodiment, an enforcement engine running on a network security device protecting a network including multiple computers, identifies top users in the network exhibiting a first suspicious behavior in a form of login failures by determining a first set of users each having a number of login failure events during a given time duration that is greater than a first threshold value. Each user of the first set of users is associated with a source computer in a first set of source computers of the multiple computers. Further, the enforcement engine identifies from the first set of source computers, a second set of source computers, representing a subset of the first set of source computers exhibiting a second suspicious behavior in a form of new computer connections by determining, during the time duration, those source computers in the first set of source computers that initiated a number of new connections that is greater than a second threshold value. Subsequently, the enforcement engine classifies a third set of source computers, representing a subset of the second set of source computers exhibiting a third suspicious behavior in a form of consecutive new computer connections, as compromised source computers, by identifying those source computers in the second set of source computers that attempted their respective new connections in a sequence that results in a Shannon entropy measure computed based on the sequence that is greater than a third threshold value.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 is a table illustrating detection results of a compromised node detection process in accordance with an embodiment of the present invention as the threshold for outliers from failed login counts is changed.

DETAILED DESCRIPTION

Figure 1:
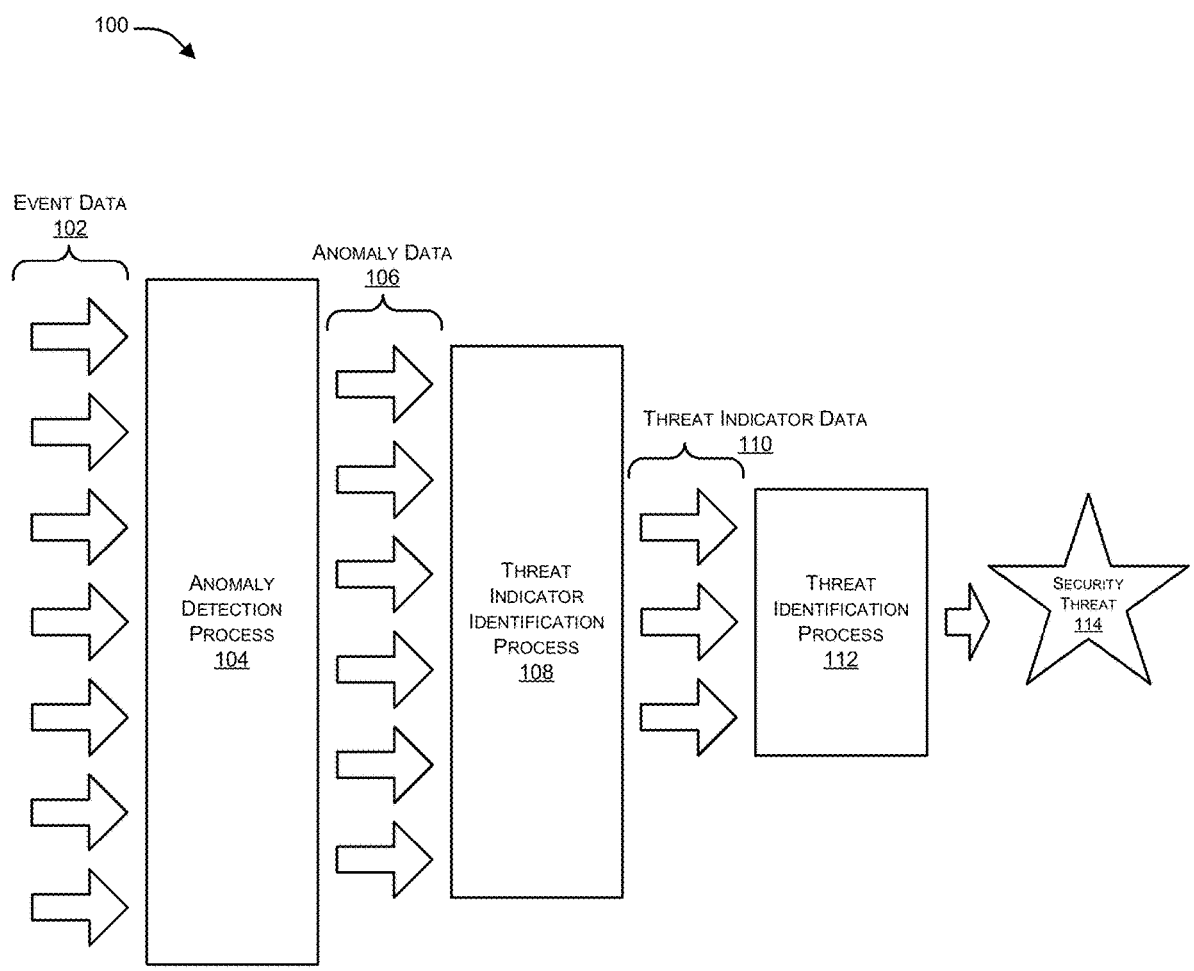
FIG. 1 is a block diagram representing a processing hierarchy for detecting anomalies, identifying threat indicators and identifying threats to network security in an attack chain.

Systems and methods are described for analyzing user behavior patterns to detect compromised computing devices in an enterprise network. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORTIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

According to various embodiments of the present disclosure, an enforcement engine running on a network security device protecting a network including multiple computers, can identify top users of the network exhibiting a first suspicious behavior in a form of login failures by determining a first set of users each having a number of login failure events during a given time duration that is greater than a first threshold value. Each user of the first set of users can be associated with a source computer in a first set of source computers of the multiple computers. Further, the enforcement engine can identify from the first set of source computers, a second set of source computers, representing a subset of the first set of source computers exhibiting a second suspicious behavior in a form of new computer connections by determining, during the time duration, those source computers in the first set of source computers that initiated a number of new connections that is greater than a second threshold value. Subsequently, the enforcement engine can identify a third set of source computers, representing a subset of the second set of source computers exhibiting a third suspicious behavior in a form of consecutive new computer connections, as compromised source computers, by identifying those source computers in the second set of source computers that attempted their respective new connections in a sequence that results in a Shannon entropy measure computed based on the sequence that is greater than a third threshold value.

According to an embodiment, the number of login failure events, for at least one user of the first set of users can follow any or a combination of normal distribution or Poisson distribution.

According to an embodiment, determining the first set of users each having a number of login failure events during a given time duration that is greater than a first threshold value can include: for each tuple of multiple tuples including a particular user of the first set of users and a particular source computer of the first set of source computers: computing a total number of failed logins for the tuple and computing a Z-score for the tuple based on number of standard deviations that the total number of failed logins is away from a mean number of failed logins for the multiple tuples observed during the given time duration during a training period; and determining those of the users associated with tuples of the multiple tuples in which the Z-score is greater than the first threshold value.

According to an embodiment, the Z-score can be computed based on a Chebyshev inequality.

According to an embodiment, the number of new connections can be evaluated based on a Jaccard index such that if, for a given computer of the second set of source computers, a value of the Jaccard index is greater than the second threshold value, the given source computer can be included as part of the second set of source computers.

According to an embodiment, the classifying can include for each source computer in the second set of source computers: computing a total number of accesses to each destination computer of the multiple computers in connection with the number of new connections; computing a probability of communication with the each destination computer; computing a normalized Shannon Entropy based on the total number of accesses and the probability of communication; and including the source computers in the third set of source computers when the normalized Shannon Entropy is greater than the third threshold value.

According to an embodiment, the enforcement engine can be initially trained for a time span so as to understand normal user behavior in the network, based on which the first, second, and third threshold values can be determined.

According to an embodiment, training of the enforcement engine can performed based on any or a combination of information obtained from login failure events and information obtained from login success events that occurred during the time span.

According to an embodiment, the information obtained can be utilized to determine a mean and a standard deviation of login failure events for each tuple of a plurality of tuples including a particular user of the plurality of users and a particular source computer of the multiple computers. Further, the information obtained can be used to determine, for each source computer of the multiple computers those destination computers of the multiple computers with which the source computer successfully logged in.

According to an embodiment, any or a combination of the first, second, and third threshold values can be optimized using a learning sub-engine that can be configured in or operatively coupled with the enforcement engine, the learning sub-engine being configured to learn from incorrect classification of source computers made by the enforcement engine in the third set of source computers.

Various embodiments of the present disclosure provide a User Entity Behavior Analytics (UEBA) anomaly detection approach that aids in detecting compromised nodes of a network because of Advanced Persistent Threats (APTs). Techniques disclosed herein minimize false positives by identifying various independent user behavior elements, e.g., failed logins, new computer connections, and a sequence of new connections. Various metrics pertaining to these different user behavior elements may be combined in a specific way to minimize false alarms and boost true positives. Also, those skilled in the art will appreciate that, as techniques disclosed herein do not require massive training data, computational overhead is reduced.

Those skilled in the art will also appreciate that, an anomaly represents a detected variation from an expected pattern of behavior on the part of an entity or a user, which may or may not constitute a threat. An anomaly represents an event of possible concern and possibly may be actionable or warrant further investigation. A detected anomaly in the activity on a computer network is often associated with one or more entities of the computer network, such as one or more physical computing devices, virtual computing devices, users, software modules, accounts, identifiers, and/or addresses. According to a processing hierarchy, anomalies in event data can be detected, and further security threats can be identified based on the detected anomalies. A security platform or a network security device can define and detect an additional type of indicator of potential security breach, called threat indicators. Threat indicators can be an intermediary level of potential security breach indicator that are defined within a hierarchy of security breach indicators including anomalies at the bottom level, threat indicators as an intermediate level, and threats at the top level.

FIG. 1 is a block diagram representing a processing hierarchy 100 for detecting anomalies, identifying threat indicators and identifying threats to network security in an attack chain. Those skilled in the art will appreciate that reducing false positives in identifying security threats to a network is one goal of a security platform or a network security device.

An overall process by which large amounts of incoming event data 102 are processed by anomaly detection process 104 to detect anomalies is described with reference to the block diagram depicted in FIG. 1. Resulting anomaly data 106, including multiple anomalies across a computer network is further processed by a threat indicator identification process 108 to identify threat indicators, which can be conceptualized as an intermediate step between detecting anomalies and identifying security threats to a computer network. As illustrated, threat indicator data 110 including multiple threat indicators identified across a computer network is further processed to identify a security threat 114 by a threat identification process 112.

An anomaly or a set of anomalies may be evaluated (e.g., scored) together. This evaluation may result in a determination of a threat indicator or a threat. Threat indicators represent an escalation of events of concern and are evaluated to identify if a threat to the security of the network exists. As an example of scale, hundreds of millions of packets of incoming event data from various data sources may be processed to yield one hundred anomalies, which may be further processed to yield ten threat indicators, which may again be further processed to yield one or two threats.

Embodiments of the present disclosure provide an improved UEBA anomaly detection approach that detects compromised nodes as a result of an APT while also minimizing false positives by identifying and combining various user behavior elements, e.g., failed logins, new computer connections and the sequence of connections opened.

Figure 2:
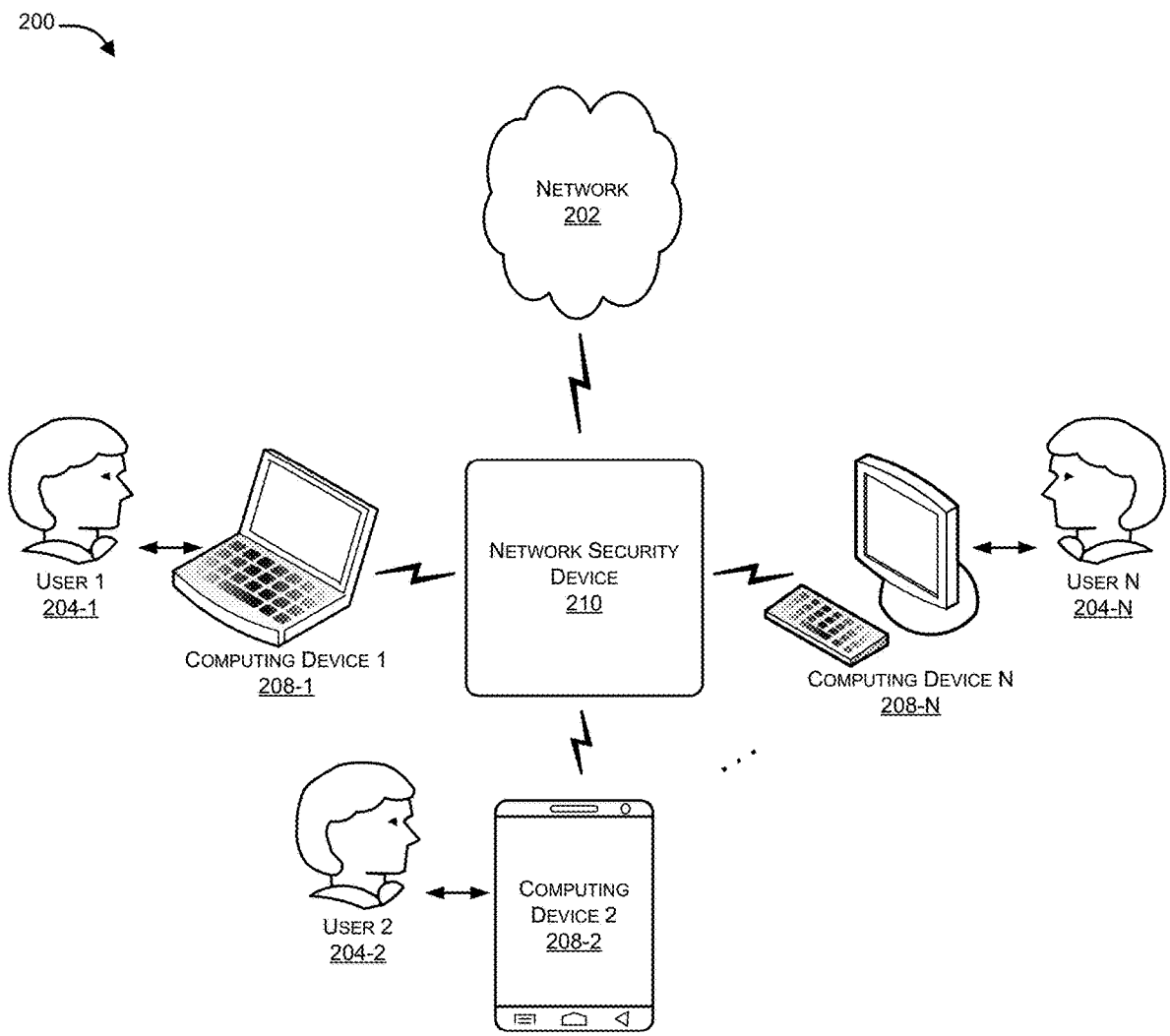
FIG. 2 is a simplified network architecture in which aspects of the present invention can be implemented in accordance with an embodiment of the present invention.

FIG. 2 is a simplified network architecture 200 in which aspects of the present invention can be implemented in accordance with an embodiment of the present invention.

According to an embodiment, a network security device 210 protecting a private network (e.g., an enterprise network) can analyze user behavior patterns to detect compromised computing devices in the enterprise network. Network security device 210 can be communicatively coupled with a public network 202, such as the Internet, so as to be available for use by the enterprise network. Network security device 210 can separate the external computing environment, represented by network 202, from the internal computing environment of the enterprise network and may intercept communications between network 202 and network appliances of the enterprise network.

In the context of the present example, the enterprise network can include multiple computing devices 208-1, 208-2, . . . , 208-N (which may be collectively referred to herein as computing devices 208 or source computers 208 and may be individually referred to herein as computing device 208 or source computer 208). Users 204-1, 204-2, . . . , 204-N (which may be collectively referred to as users 204 and may be individually referred to as user 204, hereinafter) of the enterprise network can interact with computing devices 208, non-limiting examples of which include personal computers, smart devices, web-enabled devices, hand-held devices, laptops, mobile phones and the like.

Those skilled in the art will appreciate that, various networks (e.g., network 202 and the enterprise network) in architecture 200 can include wireless networks, wired networks or a combination thereof that can be implemented as one of the different types of networks, such as Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like.

According to various embodiments of the present disclosure, an enforcement engine running on network security device 210 can identify top users from multiple users 204 of the network that exhibit a first suspicious behavior in a form of login failures. The top users can be identified by determining a first set of users each having a number of login failure events during a given time duration greater than a first threshold value. Each user 204 of the first set of users can be associated with a source computer 208 in a first set of source computers. Further, from the first set of source computers, the enforcement engine can identify a second set of source computers, representing a subset of the first set of source computers exhibiting a second suspicious behavior in a form of new computer connections by determining, during the time duration, those source computers in the first set of source computers that initiated a number of new connections greater than a second threshold value. Also, the enforcement engine can classify a third set of source computers, representing a subset of the second set of source computers exhibiting a third suspicious behavior in a form of consecutive new computer connections, as compromised source computers. The compromised source computers can be classified by identifying those source computers in the second set of source computers that attempted their respective new connections in a sequence that results in a Shannon entropy measure computed based on the sequence greater than a third threshold value. Further details regarding the enforcement engine are explained with reference to FIG. 3.

Those skilled in the art will appreciate that independently using the above-mentioned three covariates, i.e., login failure events, new computer connections and sequence of new computer connection will lead to many false alarms. Therefore, the present disclosure provides integration of the covariates in a way that leads to higher true positives and minimizes false alarms.

Figure 3:
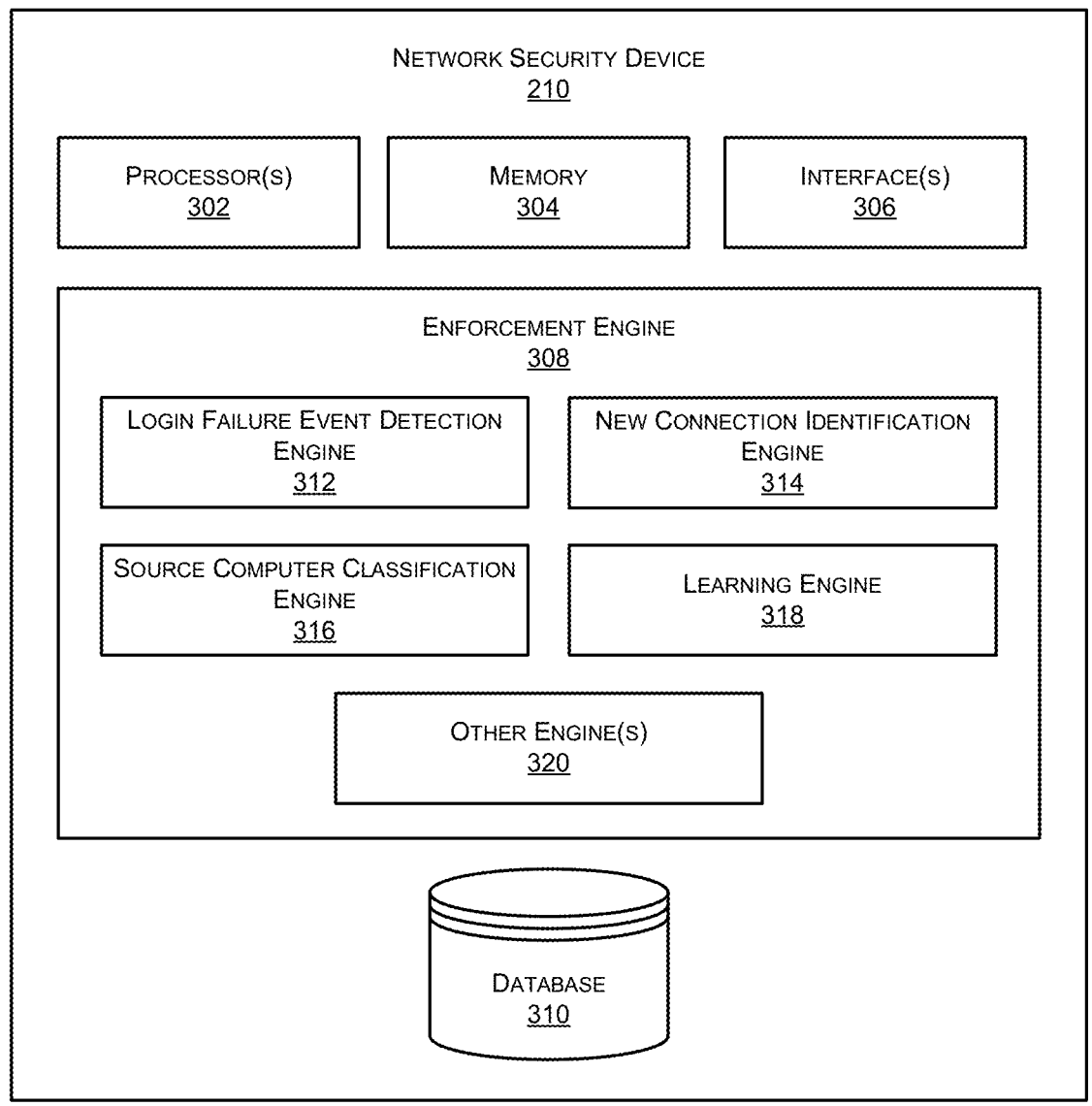
FIG. 3 illustrates an exemplary representation of functional components of a network security device in accordance with an embodiment of the present invention.

FIG. 3 illustrates an exemplary representation of functional components of a network security device 210 in accordance with an embodiment of the present invention.

As illustrated, network security device 210, can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of network security device 210. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

Network security device 210 can also include one or more interface(s) 306. Interface(s) 306 may include a variety of interfaces, for example, interfaces for data input and output devices, referred to as I/O devices, storage devices, and the like. Interface(s) 306 may facilitate communication of network security device 210 with various devices coupled to network security device 210. Interface(s) 306 may also provide a communication pathway for one or more components of network security device 210. Examples of such components include, but are not limited to, enforcement engine 308, and data 310.

Enforcement engine 308 can be implemented as a combination of hardware and software or firmware programming (for example, programmable instructions) to implement one or more functionalities of enforcement engine 308. In the examples described herein, such combinations of hardware and software or firmware programming may be implemented in several different ways. For example, the programming for the enforcement engine 308 may be processor executable instructions stored on a non-transitory machine-readable storage medium and the hardware for enforcement engine 308 may include a processing resource (for example, one or more processors), to execute such instructions. In the examples, the machine-readable storage medium may store instructions that, when executed by the processing resource, implement enforcement engine 308. In such examples, network security device 210 can include the machine-readable storage medium storing the instructions and the processing resource to execute the instructions, or the machine-readable storage medium may be separate but accessible to network security device 210 and the processing resource. In other examples, enforcement engine 308 may be implemented by electronic circuitry. Database 310 can include data that is either stored or generated as a result of functionalities implemented by any of the components of enforcement engine 308.

In an example, enforcement engine 308 can include a login failure event detection engine 312, a new connection identification engine 314, a source computer classification engine 316, a learning engine 318 and other engine(s) 320. Other engine(s) 320 can implement functionalities that supplement applications or functions performed by network security device 210 or enforcement engine 308.

According to an embodiment, login failure event detection engine 312 can identify failed logins, which inevitably occur when an attacker tries to access a network of plurality of computers using stolen credentials. Login failure event detection engine 312 can identify top users of a plurality of users of the network that exhibit a first suspicious behavior in a form of login failures. The top users can be identified by determining a first set of users whose number of login failure events during a given time duration are greater than a first threshold value. Each user of the first set of users can be associated with a source computer in a first set of source computers.

Those skilled in the art will appreciate that while each user may connect to various computers of the network using different source computers, the number of login failure events in the network usually remains consistent. According to an embodiment, the number of login failure events for a user can follow a Poisson distribution and can therefore be measured using the Poisson distribution. In another embodiment, the number of login failure events for a user can follow a normal distribution and can therefore be measured using the normal distribution. In an implementation, most anomalous login failure events can be found at end of the normal distribution and p-values can be used to identify such anomalous login failures. Both Poisson distribution and normal distribution can work equally well in identifying extreme values of login failure events, however, the normal distribution based approach can provide faster determination and can be easier to implement.

In an embodiment, the first set of users each having a number of login failure events during a given time duration greater than a first threshold value can be determined by considering multiple tuples where each tuple includes a particular user and a particular source computer. For each tuple, a total number of failed logins can be calculated for a particular time frame, e.g., a few hours, one day, or multiple days. Further, a Z-score for the tuple can be calculated using various statistics (e.g., mean and standard deviations) relating to the number of failed logins observed for the particular time frame from learning engine 318. The Z-score can be based on number of standard deviations that the total number of failed logins is away from a mean number of failed logins for the multiple tuples observed during the given the time duration during a training period. In an example, the Z-score can be calculated using Chebyshev inequality, where a certain percentage (x %) of data points can be assumed to be outliers. Generally, a value of x<1.0 is recommended. Thus, the Chebyshev inequality can use a distribution of data points to identify an optimal Z-score using the x % outlier parameter.

Furthermore, after computation of the Z-score, the first set of users can be determined that are associated with tuples for which the Z-score is greater than the first threshold value. In an implementation, during the given time duration all failed logins can be identified such that the first set of users can be grouped based on their user IDs. To provide clarity, the time duration can be considered as t and the group can be referred to as $F_t$.

Those skilled in the art will appreciate that in any network, users usually successfully access the same computers that they have historically accessed with minor exceptions. Thus, it is desirable to measure the similarity and dissimilarity of computer machines accessed to identify the typical scanning behavior exhibited by attackers as they traverse the network with stolen credentials and involving bursts of opening connections that have not been observed before.

According to an embodiment, new connection identification engine 314 can identify a second set of source computers from the first set of source computers, which can represent a subset of the first set of source computers, exhibiting a second suspicious behavior in a form of new computer connections. The second set of source computers can be identified by determining, those source computers in the first set of source computers that initiated a number of new connections that is greater than a second threshold value during the time duration.

In an example, a Jaccard index can be used to measure similarity and dissimilarity of source computer accessed. The Jaccard index can measure level of intersection between two sets, e.g., A and B. Set A can include source computers accessed by a user $U_1$ using a source computer $S_1$ over a period of time $t_1$. Set B can include source computers accessed in a time period $t_2$ by the same user $U_1$ using the same source computer $S_1$. A high value of the Jaccard index is indicative of the same user accessing the same set of source computers over a period of time, which is normal in a computer network. Conversely, a low Jaccard index, especially over an extended period of time, can signify suspicious behavior of users. In one embodiment, the Jaccard index $J_1$ can be computed using the following:

$$J_1 = \frac{\text{Intersection}(A, B)}{\text{Union}(A, B)} \quad (1)$$

Thus, the number of new connections can be evaluated based on the Jaccard index such that if, for a given computer of the first set of source computers, a value of the Jaccard index is greater than the second threshold value, the given source computer is included as part of the second set of source computers.

To provide clarity, in context of an example, for source computer S in the set $F_t$ identified by login failure event detection engine 312, a set of destination computers of the network that S has successfully communicated with can be calculated in connection with determining the Jaccard index by using a set of destination computers obtained from learning engine 318 indicating destination computers that S has communicated with during a training period. Further, the second set of source computers is identified based on those source computers in the first set of source computers having a Jaccard index greater than the second threshold. The group of source computers representing the second set of source computers can be referred to as $J_t$.

Those skilled in the art will appreciate that, when an attacker traverses a network, the sequence of nodes accessed by the attacker is also critical. During, normal network usage, users repeatedly access the same computers. Therefore, suspicious behavior is indicated when the sequence of computers accessed represents a series of new connections.

According to an embodiment, source computer classification engine 316 can classify a third set of source computers as compromised source computers, which exhibit a third suspicious behavior in a form of consecutive new computer connections. The third set of source computers can represent a subset of the second set of source computers.

In an example, Shannon entropy, indicating a measure of uncertainty, can be used to identify new sequences of computers accessed. If a source computer opens a new connection each time, then the Shannon entropy measure continues to increase. To provide clarity, $p_1$ represents the likelihood of a source computer $S_1$ accessing a vector of computers P. The Shannon entropy can be computed by:

$$SE = \Sigma(p_i \log_2 p_i) \quad (2)$$

As probabilities $p_1$ reduce since there are no repeated access and the size of vector P continues to grow, SE also grows. This may indicate lateral attacks in an enterprise network. In order to normalize the Shannon entropy metric, a maximum Shannon entropy can be used. The maximum entropy ($SE_{max}$) for a series of accesses can be the Shannon entropy (SE) assuming all the connected computers are unique and there are no repetitions. The two measures, i.e., SE and $SE_{max}$ can be combined to determine a percentage Shannon entropy (SE %) measure as follows:

$$SE_\% = \frac{SE}{SE_{max}} \quad (3)$$

In the context of the present example, a source computer responsible for repeated access to new computers all the time will have 100% of the SE % measure since the Shannon entropy is equivalent to the maximum Shannon entropy $SE_{max}$, whereas, a source computer that keeps accessing the same computer repeatedly will have a zero value for SE %.

According to an embodiment, the classification of the compromised source computers can be performed by identifying those source computers in the second set of source computers that attempted their respective new connections in a sequence that results in a Shannon entropy measure computed based on the sequence that is greater than a third threshold value.

In an implementation, for each source computer S in the second set of source computers $J_t$ obtained from new connection identification engine 314, a total number of accesses to each destination computer in connection with the number of new connections can be computed. Further, a probability of communication with each destination computer and the normalized Shannon Entropy based on the total number of accesses and the probability of communication can be calculated. The source computers can be included in the third set of source computers when the normalized Shannon Entropy is greater than the third threshold value. The third set of computers can be referred to as $S_t$.

According to an embodiment, learning engine 318 can be initially trained for a time span so as to understand normal user behavior in the network, based on which the first, second, and third threshold values can be determined. Training of the enforcement engine 308 can be performed based on any or a combination of information obtained from login failure events and information obtained from login success events that occurred during the time span.

In an embodiment, the information obtained can be utilized to determine a mean and a standard deviation of login failure events for each tuple of multiple tuples including a particular user and a particular source computer. For example, from login failure events, a daily mean and standard deviation of the total number of failed logins for a tuple comprising a user and a source computer can be calculated and provided to the login failure event detection engine 312. Further, the information obtained can be used to determine, for each source computer, those destination computers with which the source computer successfully logged in. For example, from successful logon events during the day, for each source computer, a list of destination computers that the source computer has successfully communicated with can be determined and provided to new connection identification engine 314.

Those skilled in the art will appreciate that, a collection of network access logs covering a period of time t containing user IDs which uniquely identify users and source-computer IDs that identify the source computers used to access destination computers with unique destination computer IDs can be used for training by learning engine 318. Further, any or a combination of the first, second, and third threshold values can be optimized using learning engine 318 that can be configured to learn from incorrect classification of source computers made by source computer classification engine 316 as part of third set of source computers.

Figure 4:
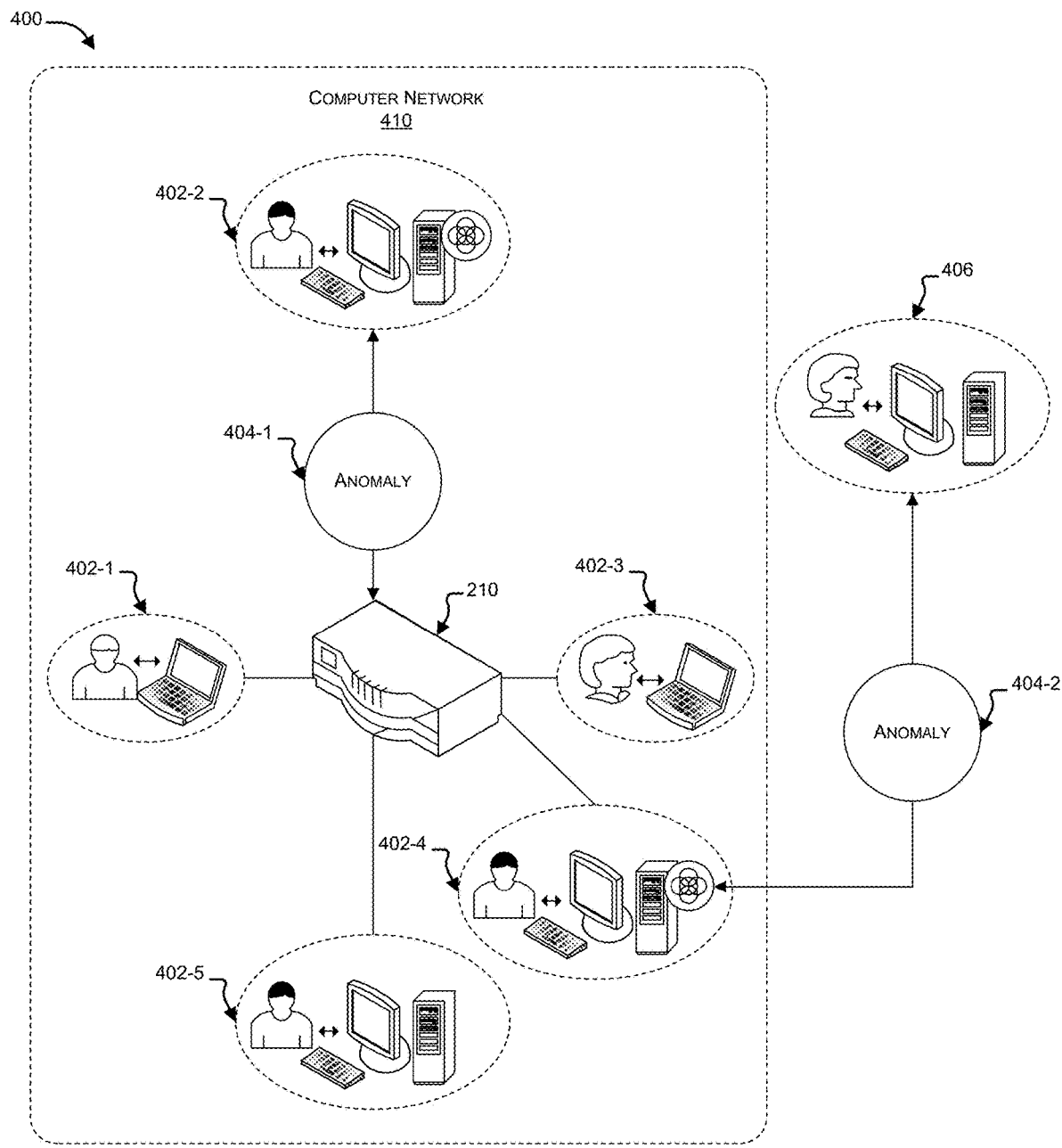
FIG. 4 illustrates an example of compromised node detection in accordance with an embodiment of the present invention.

FIG. 4 illustrates an example 400 of compromised node detection in accordance with an embodiment of the present invention.

As illustrated, an enterprise network or private network as represented by computer network 410 (enclosed by the dotted rectangle) includes internal entities 402-1, 402-2, 402-3, 402-4 and 402-5, each having a user and a corresponding computer. As used herein, an entity should be broadly understood to include any sort of element or component operating within or otherwise associated with a computer network. For example, entities may include physical computing devices, virtual computing devices, users, software modules, accounts, identifiers, and addresses. Operating outside of computer network 410 can be an external entity 406 that may be associated with a malicious actor causing anomaly 404-2. Communications may occur between different internal entities, e.g., 402-4 and external entity 406, and also between internal entities 402-1, 402-2, 402-3, 402-4 and 402-5, which may cause an anomaly in computer network 410, e.g. 404-1. In some embodiments, analysis of these communications by network security device 210 can lead to the detection of anomalies 404-1 and 404-2 and compromised source computers, e.g., computers associated with internal entities 404-2 and 402-4. For example, as described above, network security device 210 can aggregate three covariates, i.e., login failure events, new computer connections and the sequence of new computer connections to detect compromised source computers.

FIG. 5 is a table 500 illustrating detection results of a compromised node detection process in accordance with an embodiment of the present invention as the threshold for outliers from failed login counts is changed.

In an example implementation, embodiments of the present disclosure were tested using a public dataset (obtained from Los Alamos Laboratory data) collected from an enterprise network including over 10000 nodes over a duration of 21 days. Using embodiments of the present disclosure, anomalous behavior consistent with events that the dataset had marked as being attack related were detected. As part of the data set, attack related events had been identified. Further, embodiments of the present disclosure were implemented through the same dataset, using different first threshold values indicating threshold of login failure events to observe effect in terms of detection of anomalous events. Table 500 indicates results as the threshold for outliers from failed login counts was varied. It was observed that the detection rates can be achieved when outliers are considered to be greater than six times the average number of failed logins with the average failed logins being 2.039 in this example.

Figure 6A:
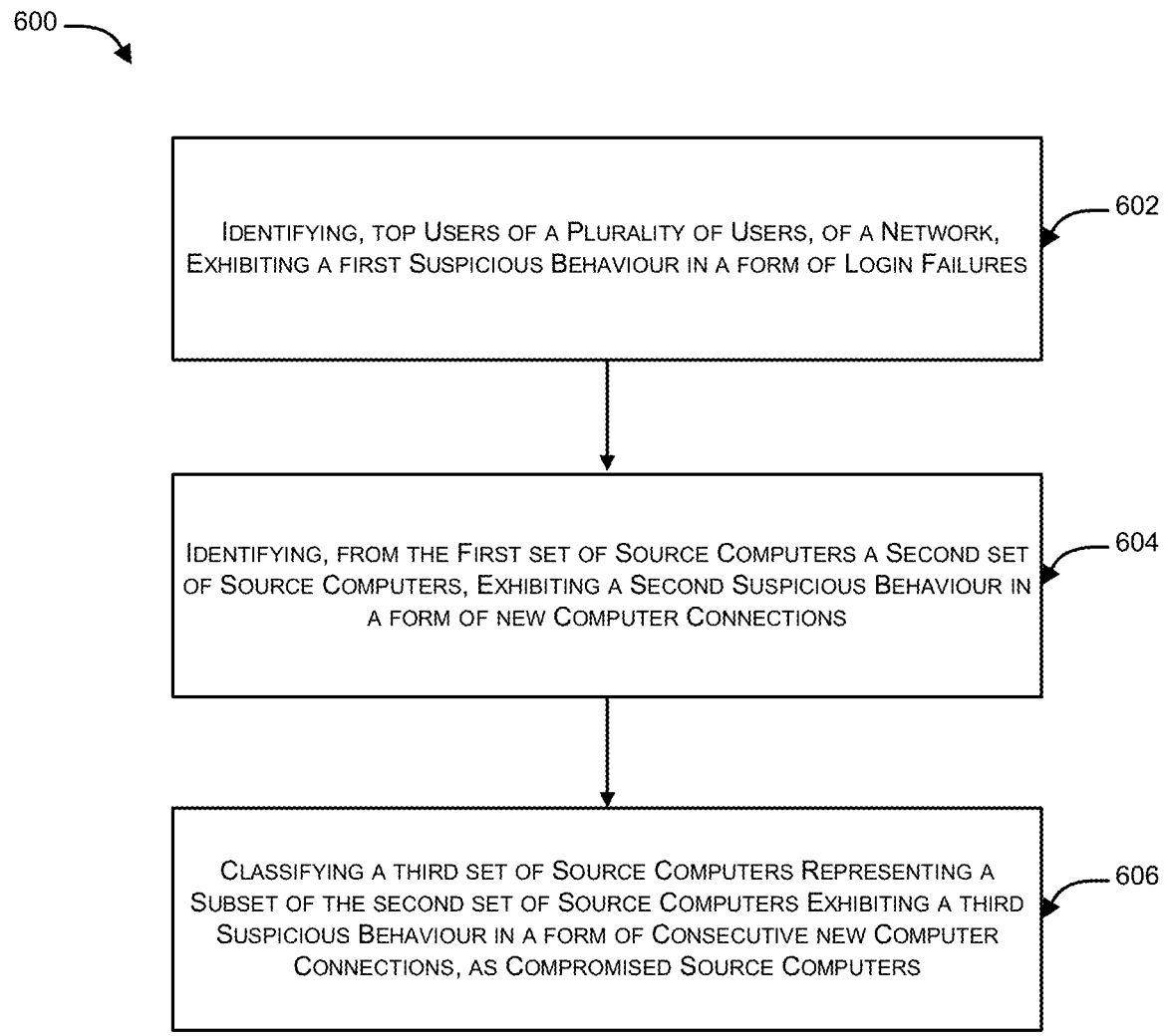
FIG. 6A is a high-level flow diagram illustrating a process for detecting a compromised node in accordance with an embodiment of the present invention.

FIG. 6A is a high-level flow diagram 600 illustrating a process for detecting a compromised node in accordance with an embodiment of the present invention.

In context of the present example, at block 602 an enforcement engine running on a network security device protecting a network including multiple computers, can identify top users of multiple users of the network that exhibit a first suspicious behavior in a form of login failures. The top users can be identified by determining a first set of users each having a number of login failure events during a given time duration greater than a first threshold value. Also each user of the first set of users can be associated with a source computer in a first set of source computers of the plurality of computers.

At block 604, the enforcement engine can identify from the first set of source computers, a second set of source computers that represent a subset of the first set of source computers and exhibit a second suspicious behavior in a form of new computer connections. The second set of source computers can be identified by determining, during the time duration, those source computers in the first set of source computers that initiated a number of new connections greater than a second threshold value.

Further, at block 606 the enforcement engine can classify a third set of source computers that represent a subset of the second set of source computers and exhibit a third suspicious behavior in a form of consecutive new computer connections, as compromised source computers. The compromised source computers can be classified by identifying those source computers in the second set of source computers that attempted their respective new connections in a sequence that results in a Shannon entropy measure computed based on the sequence greater than a third threshold value.

Figure 6B:
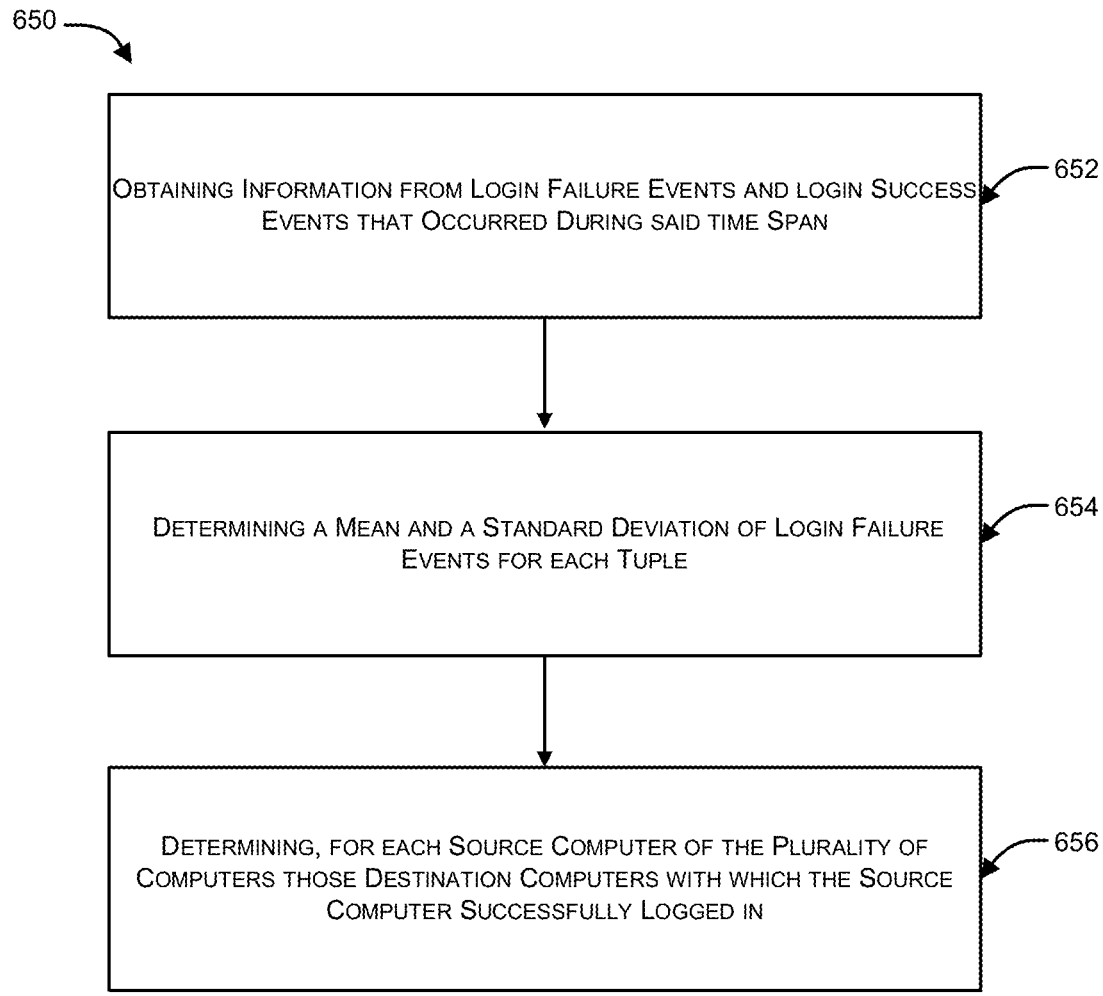
FIG. 6B is a high-level flow diagram illustrating a process for training an enforcement engine in accordance with an embodiment of the present invention.

FIG. 6B is a high-level flow diagram 650 illustrating a process for training an enforcement engine in accordance with an embodiment of the present invention.

According to an embodiment, the enforcement engine can be initially trained for a time span so as to understand normal user behavior in the network, based on which the first, second, and third threshold values can be determined. In the context of the present disclosure, at block 652, the training of the enforcement engine can be performed based on any or a combination of information obtained from login failure events and information obtained from login success events that occurred during the time span.

At block 654, the information obtained can be utilized to determine a mean and a standard deviation of login failure events for each tuple of multiple tuples including a particular user of the multiple users and a particular source computer of the multiple computers and at block 656 the information obtained is used to determine, for each source computer of the multiple computers those destination computers of the multiple computers with which the source computer successfully logged in.

Figure 7A:
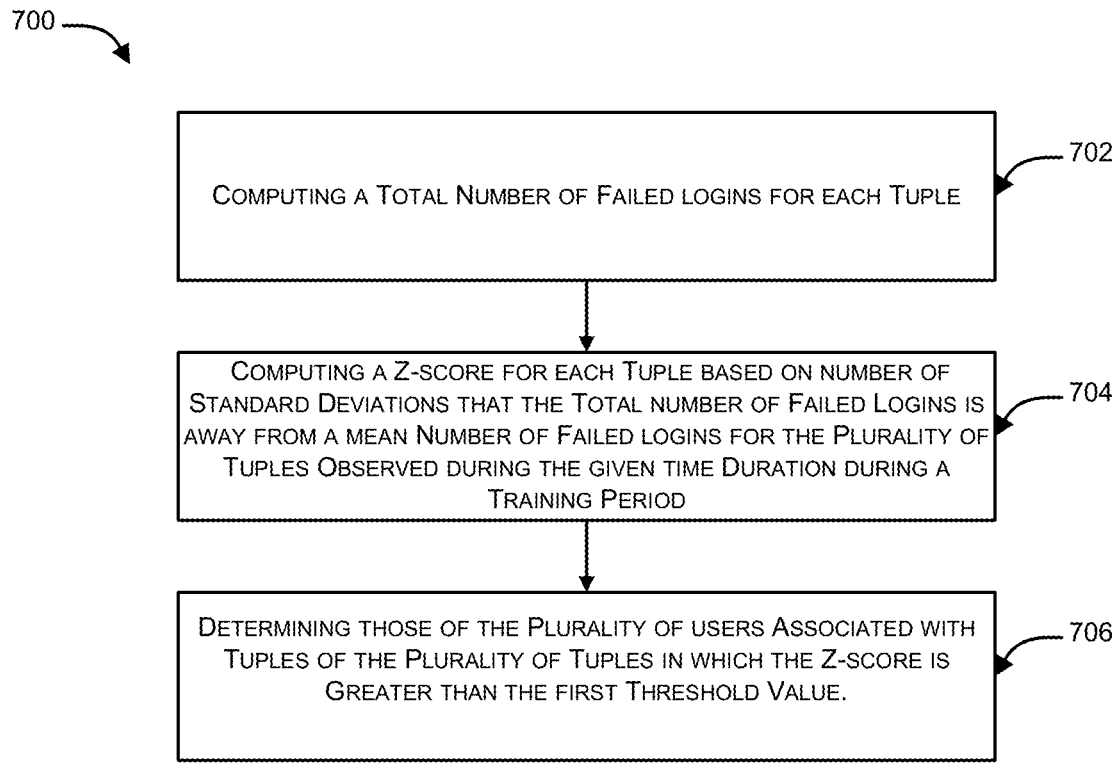
FIG. 7A-C are flow diagrams illustrating exemplary processes utilized for detecting a compromised node in accordance with an embodiment of the present invention.
Figure 7B:
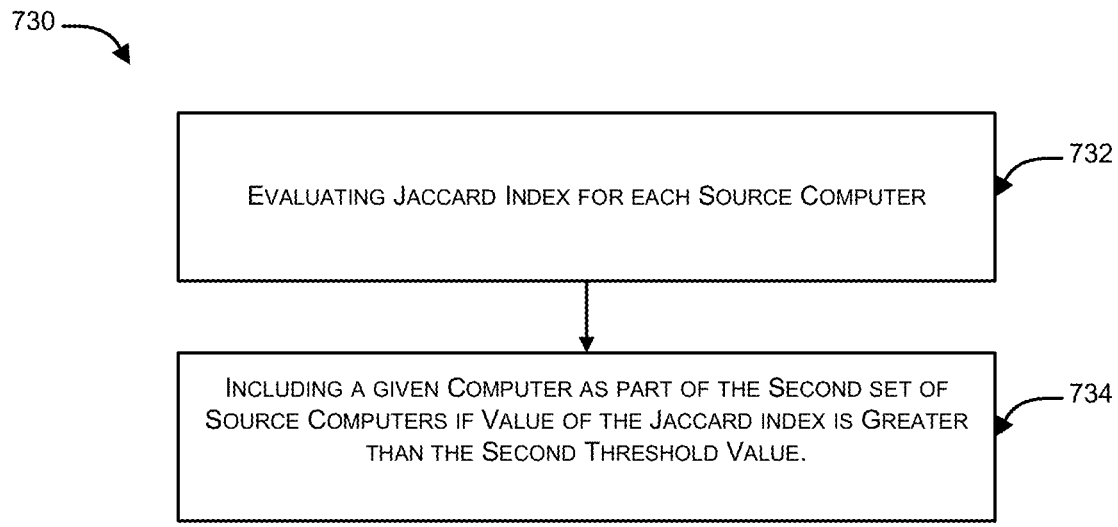
Figure 7C:
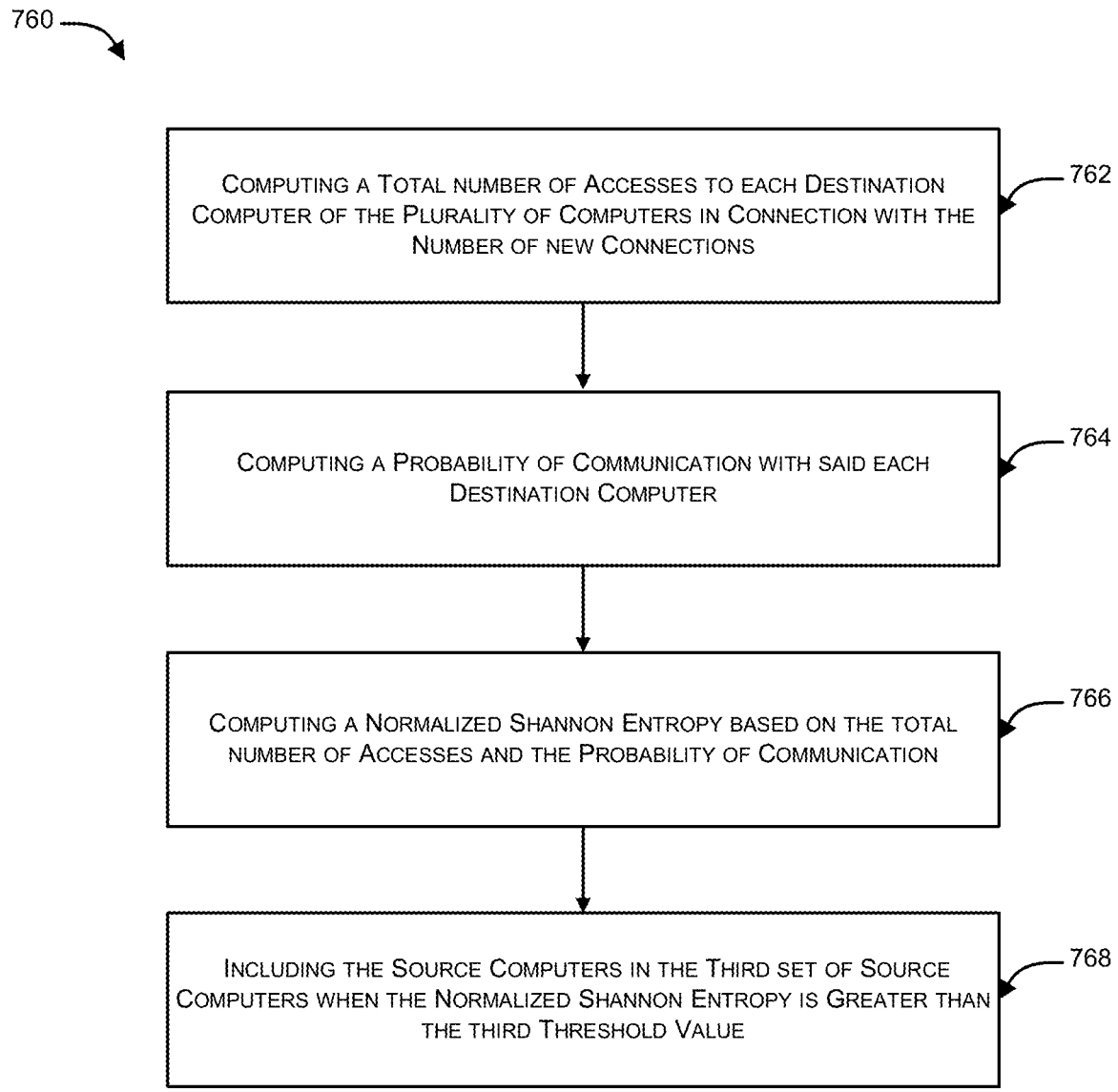

FIG. 7A-C are flow diagrams 700, 730 and 760 illustrating exemplary processes utilized for detecting a compromised node in accordance with an embodiment of the present invention.

FIG. 7A illustrates an exemplary flow diagram 700 indicating a process utilized for identifying a first set of source computers exhibiting a first suspicious behavior in a form of login failures. In context of the present example, for each tuple of multiple tuples including a particular user of the first set of users and a particular source computer of the first set of source computers the process can include at block 702, computing a total number of failed logins for the tuple and at block 704, computing a Z-score for the tuple based on a number of standard deviations that the total number of failed logins is away from a mean number of failed logins for the multiple tuples observed during the given time duration during a training period. In an implementation, the mean and standard deviation values can be obtained in accordance with block 654. Further, at block 706, those of the multiple users associated with tuples of the multiple tuples in which the Z-score is greater than the first threshold value can be determined for identifying the first set of source computers.

FIG. 7B illustrates an exemplary flow diagram 730 indicating a process utilized for identifying a second set of source computers, representing a subset of the first set of source computers exhibiting a second suspicious behavior in a form of new computer connections. In the context of the present example, at block 732, for each source computer of the first set of source computers, a Jaccard index value can be evaluated. Further, at block 734, the number of new connections can be evaluated based on the Jaccard index such that if, for a given computer of the second set of source computers, a value of the Jaccard index is greater than the second threshold value, the given source computer can be included as part of the second set of source computers.

FIG. 7C illustrates an exemplary flow diagram 760 indicating a process utilized for classifying a third set of source computers, representing a subset of the second set of source computers exhibiting a third suspicious behavior in a form of consecutive new computer connections, as compromised source computers. In the context of the present example, for each source computer in the second set of source computers, at block 762, a total number of accesses to each destination computer of the multiple computers in connection with the number of new connections can be computed. At block 764, a probability of communication with each destination computer can be computed. Further, at block 766, a normalized Shannon Entropy can be computed based on the total number of accesses and the probability of communication and at block 768, the source computers in the second set of source computers can be included in the third set of source computers when the normalized Shannon Entropy is greater than the third threshold value.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 8:
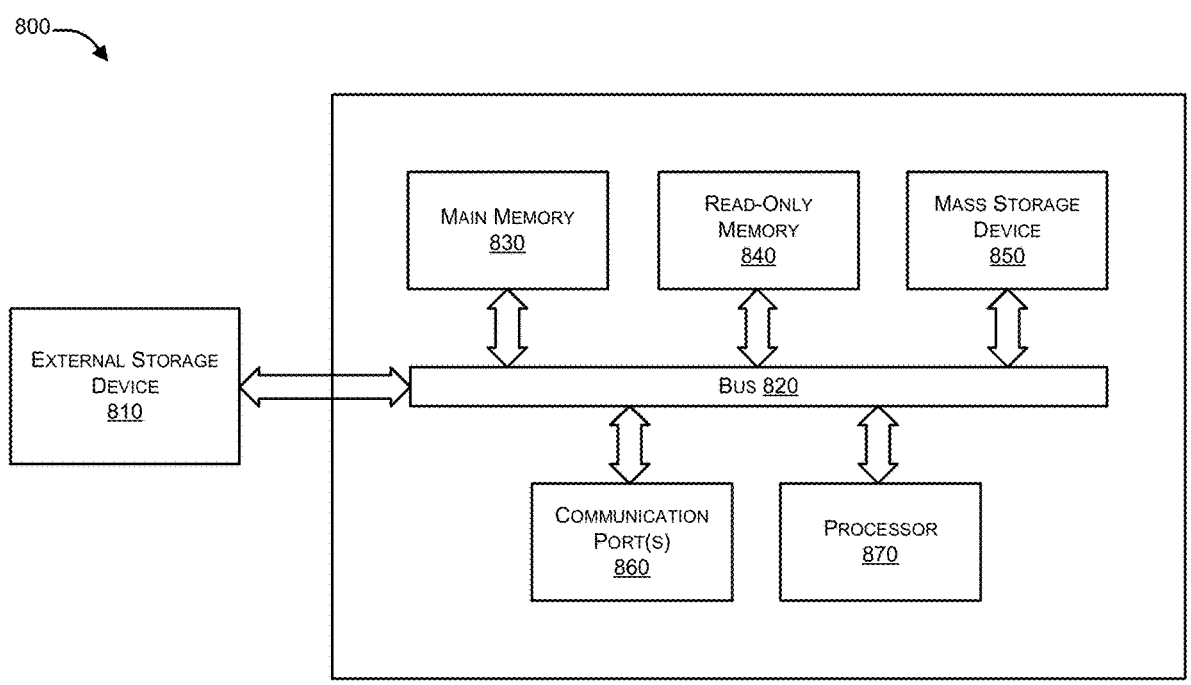
FIG. 8 illustrates an exemplary computer system in which or with which embodiments of the present invention may be utilized.

FIG. 8 illustrates an exemplary computer system 800 in which or with which embodiments of the present invention may be utilized.

Computer system 800 may represent all or a portion of network security device 210. As shown in FIG. 8, computer system 800, includes an external storage device 810, a bus 820, a main memory 830, a read only memory 840, a mass storage device 850, a communication port 860, and a processor 870.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    identifying, by an enforcement engine running on a network security device protecting a network including a plurality of computers, top users of a plurality of users of the network exhibiting a first suspicious behavior in a form of login failures by determining a first set of users of the plurality of users each having a number of login failure events during a given time duration that is greater than a first threshold value, wherein each user of the first set of users is associated with a source computer in a first set of source computers of the plurality of computers;
    identifying, by the enforcement engine, from the first set of source computers, a second set of source computers, representing a subset of the first set of source computers exhibiting a second suspicious behavior in a form of new computer connections by determining, during the time duration, those source computers in the first set of source computers that initiated a number of new connections that is greater than a second threshold value; and
    classifying, by the enforcement engine, a third set of source computers, representing a subset of the second set of source computers exhibiting a third suspicious behavior in a form of consecutive new computer connections, as compromised source computers, by identifying those source computers in the second set of source computers that attempted their respective new connections in a sequence that results in a Shannon entropy measure computed based on the sequence that is greater than a third threshold value.

2. The method of claim 1, wherein the number of login failure events, for at least one user of said first set of users, follows any or a combination of normal distribution or Poisson distribution.

3. The method of claim 1, wherein said determining the first set of users of the plurality of users each having a number of login failure events during a given time duration that is greater than a first threshold value comprises:
    for each tuple of a plurality of tuples including a particular user of the first set of users and a particular source computer of the first set of source computers:
        computing a total number of failed logins for the tuple; and
        computing a Z-score for the tuple based on number of standard deviations that the total number of failed logins is away from a mean number of failed logins for the plurality of tuples observed during the given time duration during a training period; and
        determining those of the plurality of users associated with tuples of the plurality of tuples in which the Z-score is greater than the first threshold value.

4. The method of claim 3, wherein the Z-score is computed based on Chebyshev inequality.

5. The method of claim 1, wherein the number of new connections is evaluated based on Jaccard index such that if, for a given computer of the second set of source computers, a value of said Jaccard index is greater than the second threshold value, said given source computer is included as part of the second set of source computers.

6. The method of claim 1, wherein said classifying comprises:
for each source computer in the second set of source computers:
computing a total number of accesses to each destination computer of the plurality of computers in connection with the number of new connections;
computing a probability of communication with said each destination computer;
computing a normalized Shannon Entropy based on the total number of accesses and the probability of communication; and
including the source computers in the third set of source computers when the normalized Shannon Entropy is greater than the third threshold value.

7. The method of claim 1, wherein said enforcement engine is initially trained for a time span so as to understand normal user behavior in the network, based on which said first, second, and third threshold values are determined.

8. The method of claim 7, wherein training of said enforcement engine is performed based on any or a combination of information obtained from login failure events and information obtained from login success events that occurred during said time span.

9. The method of claim 8, wherein the information obtained is utilized to determine a mean and a standard deviation of login failure events for each tuple of a plurality of tuples including a particular user of the plurality of users and a particular source computer of the plurality of computers, and wherein the information obtained is used to determine, for each source computer of the plurality of computers those destination computers of the plurality of computers with which the source computer successfully logged in.

10. The method of claim 1, wherein any or a combination of said first, second, and third threshold values are optimized using a learning sub-engine that is configured in or operatively coupled with said enforcement engine, said learning sub-engine being configured to learn from incorrect classification of source computers made by said enforcement engine in said third set of source computers.

11. A non-transitory computer-readable storage medium embodying a set of instructions, which when executed by one or more processors of a network security device protecting a network including a plurality of computer systems, causes the one or more processors to perform a method comprising:
identifying top users of a plurality of users of the network exhibiting a first suspicious behavior in a form of login failures by determining a first set of users of the plurality of users each having a number of login failure events during a given time duration that is greater than a first threshold value, wherein each user of the first set of users is associated with a source computer in a first set of source computers of the plurality of computers;
identifying from the first set of source computers, a second set of source computers, representing a subset of the first set of source computers exhibiting a second suspicious behavior in a form of new computer connections by determining, during the time duration, those source computers in the first set of source computers that initiated a number of new connections that is greater than a second threshold value; and
classifying a third set of source computers, representing a subset of the second set of source computers exhibiting a third suspicious behavior in a form of consecutive new computer connections, as compromised source computers, by identifying those source computers in the second set of source computers that attempted their respective new connections in a sequence that results in a Shannon entropy measure computed based on the sequence that is greater than a third threshold value.

12. The non-transitory computer-readable storage medium of claim 11, wherein the number of login failure events, for at least one user of said first set of users, follows any or a combination of normal distribution or Poisson distribution.

13. The non-transitory computer-readable storage medium of claim 11, wherein said determining a first set of users of the plurality of users each having a number of login failure events during a given time duration that is greater than a first threshold value comprises:
for each tuple of a plurality of tuples including a particular user of the first set of users and a particular source computer of the first set of source computers:
computing a total number of failed logins for the tuple; and
computing a Z-score for the tuple based on number of standard deviations that the total number of failed logins is away from a mean number of failed logins for the plurality of tuples observed during the given time duration during a training period; and
determining those of the plurality of users associated with tuples of the plurality of tuples in which the Z-score is greater than the first threshold value.

14. The non-transitory computer-readable storage medium of claim 13, wherein the Z-score is computed based on Chebyshev inequality.

15. The non-transitory computer-readable storage medium of claim 11, wherein the number of new connections is evaluated based on Jaccard index such that if, for a given computer of the second set of source computers, a value of said Jaccard index is greater than the second threshold value, said given source computer is included as part of the second set of source computers.

16. The non-transitory computer-readable storage medium of claim 11, wherein said classifying comprises:
for each source computer in the second set of source computers:
computing a total number of accesses to each destination computer of the plurality of computers in connection with the number of new connections;
computing a probability of communication with said each destination computer;
computing a normalized Shannon Entropy based on the total number of accesses and the probability of communication; and
including the source computers in the third set of source computers when the normalized Shannon Entropy is greater than the third threshold value.

17. The non-transitory computer-readable storage medium of claim 11, wherein the network security device is initially trained for a time span so as to understand normal user behavior in the network, based on which said first, second, and third threshold values are determined.

18. The non-transitory computer-readable storage medium of claim 17, wherein training of the network security device is performed based on any or a combination of information obtained from login failure events and information obtained from login success events that occurred during said time span.

19. The non-transitory computer-readable storage medium of claim 18, wherein the information obtained is utilized to determine a mean and a standard deviation of login failure events for each tuple of a plurality of tuples including a particular user of the plurality of users and a particular source computer of the plurality of computers, and wherein the information obtained is used to determine, for each source computer of the plurality of computers those destination computers of the plurality of computers with which the source computer successfully logged in.

20. The non-transitory computer-readable storage medium of claim 11, wherein any or a combination of said first, second, and third threshold values are optimized using a learning sub-engine that is configured in or operatively coupled with the network security device, said learning sub-engine being configured to learn from incorrect classification of source computers made by the network security device in said third set of source computers.

21. A threat detection system, the system comprising:
a network security device protecting a network including a plurality of computer systems;
a non-transitory computer-readable storage medium embodying a set of instructions, which when executed by one or more processors of the network security device, causes the one or more processors to perform a method including:

identifying top users of a plurality of users of the network exhibiting a first suspicious behavior in a form of login failures by determining a first set of users of the plurality of users each having a number of login failure events during a given time duration that is greater than a first threshold value, wherein each user of the first set of users is associated with a source computer in a first set of source computers of the plurality of computers;

identifying from the first set of source computers, a second set of source computers, representing a subset of the first set of source computers exhibiting a second suspicious behavior in a form of new computer connections by determining, during the time duration, those source computers in the first set of source computers that initiated a number of new connections that is greater than a second threshold value; and classifying a third set of source computers, representing a subset of the second set of source computers exhibiting a third suspicious behavior in a form of consecutive new computer connections, as compromised source computers, by identifying those source computers in the second set of source computers that attempted their respective new connections in a sequence that results in a Shannon entropy measure computed based on the sequence that is greater than a third threshold value.

\* \* \* \* \*